United States Patent [19]

Tucker et al.

[11] Patent Number: 4,889,590

[45] Date of Patent: Dec. 26, 1989

[54] SEMICONDUCTOR PRESSURE SENSOR MEANS AND METHOD

[75] Inventors: Robert L. Tucker, Phoenix; Joseph M. Staller, Tempe, both of Ariz.

[73] Assignee: Motorola Inc., Schaumburg, Ill.

[21] Appl. No.: 343,986

[22] Filed: Apr. 27, 1989

[51] Int. Cl.[4] .................. H01L 21/306; B44C 1/22; C03C 15/00; C03C 25/06

[52] U.S. Cl. .................. 156/647; 29/621.1; 73/708; 73/721; 156/651; 156/657; 156/659.1; 156/662; 338/4; 428/156

[58] Field of Search ............ 156/643, 647, 651, 657, 156/659.1, 662; 357/26; 73/708, 720, 721, 726, 727; 338/4, 42; 29/25.36, 621.1; 428/156, 157, 167; 437/225

[56] References Cited

U.S. PATENT DOCUMENTS

| | | | |
|---|---|---|---|
| 3,213,681 | 10/1965 | Pearson | 73/141 |
| 3,230,763 | 12/1960 | Frantzis | 73/141 |
| 3,758,830 | 9/1973 | Jackson | 317/234 R |
| 3,767,494 | 10/1973 | Muraoka | 156/17 |
| 3,968,466 | 7/1976 | Nakamura | 338/42 |
| 3,994,009 | 11/1976 | Hartlaub | 357/26 |
| 4,065,970 | 1/1978 | Wilner | 73/398 |
| 4,180,422 | 12/1979 | Rosvold | 156/647 X |
| 4,204,185 | 5/1980 | Kurtz et al. | 338/4 |
| 4,275,406 | 6/1981 | Müller et al. | 357/26 |
| 4,317,126 | 2/1982 | Gragg | 357/26 |
| 4,618,397 | 10/1986 | Shimizu et al. | 156/628 |
| 4,670,969 | 6/1987 | Yamada et al. | 29/576 |
| 4,672,354 | 6/1987 | Kurtz et al. | 338/4 |
| 4,783,237 | 11/1988 | Aine et al. | 437/15 |
| 4,784,721 | 11/1988 | Holmen et al. | 156/647 |
| 4,802,952 | 2/1989 | Kobori et al. | 156/634 |

*Primary Examiner*—William A. Powell
*Attorney, Agent, or Firm*—Robert M. Handy

[57] ABSTRACT

A piezo-resistive pressure sensor element is formed in the front face of a silicon wafer. A thin diaphragm is formed under the sensing element by anisotropically etching a cavity from the rear face of the wafer. The rear face (cavity-side) rupture pressure of the silicon diaphragm is at least doubled by subjecting the anisotropically etched cavity to a mild isotropic etch. This substantially improves the cavity-side over-pressure rating of the finished pressure sensor without any significant change in the device sensitivity or allows higher sensitivity to be obtained for the same over-pressure rating or intermediate combinations thereof.

20 Claims, 2 Drawing Sheets

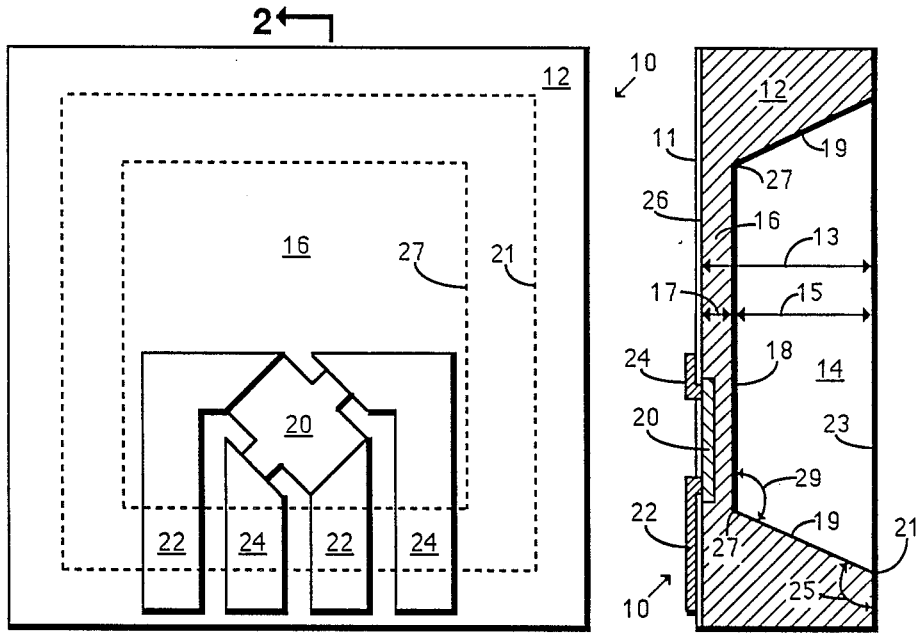
FIG. 1
FIG. 2
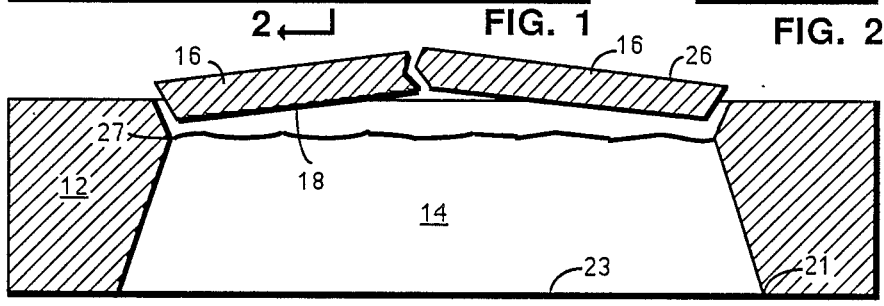
FIG. 3
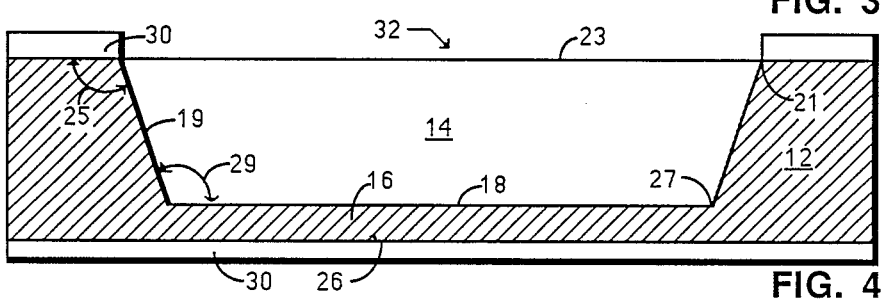
FIG. 4
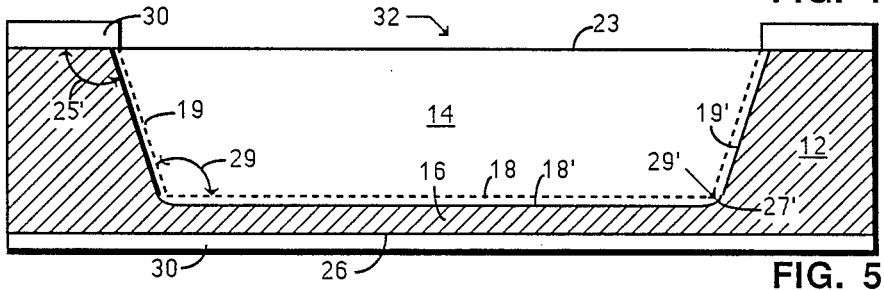
FIG. 5

SEMICONDUCTOR PRESSURE SENSOR MEANS AND METHOD

FIELD OF THE INVENTION

This invention concerns improved means and method for pressure sensors and, more particularly, improved means and methods for semiconductor pressure sensors.

BACKGROUND OF THE INVENTION

It is well known in the electronic arts to manufacture pressure sensors using semiconductor substrates. Silicon is the most commonly used semiconductor material although other piezo-resistive and piezo-electric materials can also be used.

In a typical semiconductor pressure sensor, a piezo-resistive region is formed in or on the semiconductor surface. A current is passed through the resistor and the voltage developed across the resistor is measured. The resistor is generally oriented so that the largest piezo-resistive effect is obtained when the silicon substrate is bent in response to the applied pressure or force. In order to increase the sensitivity of such devices, the piezo-resistive region is typically formed in or on a portion of the silicon substrate which has been made much thinner, e.g., an etched diaphragm or beam. The diaphragm or beam is usually some regular geometric shape, e.g., a circle, square, ellipsoid, rectangle, etc. Diaphragm type pressure sensors and methods for producing them are described in U.S. Pat. Nos. 4,783,237, 4,672,354, 4,670,969, 4,317,126, 4,275,406, 4,204,185, 3,994,009, 3,968,466, 3,767,494, 3,758,830, and 3,230,763 which are incorporated herein by reference.

The sensitivity of such semiconductor devices depends, among other things, on the crystallographic orientation of the substrate, the direction of current flow, and the thickness and lateral size of the diaphragm. Generally, the design of such pressure sensors requires a balancing of conflicting or competing requirements, including those associated with manufacturing, device size, cost and the like, in order to obtain the most useful result.

Among the most difficult operations required during manufacture of such sensors is the etching of the diaphragm since the diaphragm thickness and size crucially affect device performance and manufacturing yield. In a typical device, a doped resistor region is formed on the substantially planar front face of a semiconductor wafer. Then, approximately ninety percent or more of the thickness of the wafer immediately behind the resistor region is removed by etching a cavity inward from the opposed rear face of the wafer to form the pressure sensing diaphragm. Silicon having {100} orientation is much used for manufacturing pressure sensors because of its known anisotropic etching characteristics that assist in controlling the thickness and shape of the silicon diaphragm.

Silicon pressure sensors formed in this fashion are comparatively easy to make, have generally good sensitivity and repeatability, and are sufficiently rugged to be useful in a variety of applications. Means and method for their manufacture are well known in the art.

In many applications, the pressure to be measured is applied to the front (planar) face of the pressure sensor while the rear (cavity) face is the reference side. This arrangement is particularly common where pressure differentials above atmospheric pressure are to be measured. However, there are an increasing number of applications where it is desirable to be able to pressurize the cavity side of the diaphragm, and with pressures approaching ten atmospheres or more. The higher the applied pressure, the greater the stress on the diaphragm and the greater the incidence of diaphragm rupture.

It has been found that anisotropically etched pressure sensors exhibit asymmetrical over-pressure failure, that is, the diaphragm rupture pressure is much smaller when the pressure is applied to the rear (cavity-side) face of the diaphragm than when applied to the front (planar-side) face of the diaphragm. This is highly undesirable, since it makes it much more difficult to build anisotropically etched pressure sensors that combine good sensitivity with adequate rear-face diaphragm rupture capability.

Accordingly, it is an object of the present invention to provide an improved means and method for forming etched cavity type devices. It is a further object of the present invention to provide an improved means and method for diaphragm type pressure sensors which increases the rearface (cavity-side) diaphragm failure pressure.

BRIEF SUMMARY OF THE INVENTION

The foregoing and other objects and advantages are achieved, in a first embodiment, by the method of providing a substrate having first and second opposed faces, anisotropically etching a cavity in the substrate from the first face to form a diaphragm adjacent the second face, isotropically etching the cavity to increase the diaphragm rupture strength for pressure applied to the first face, and anytime after the providing step, forming an electronic element on the diaphragm. It is convenient to form the pressure sensing element on the second face. Desirably, the isotropic etching step removes less than ten percent of the thickness of the central region of the diaphragm. A preferred isotropic etchant comprises nitric acid, water or acetic acid or water-acetic acid mixtures, and ammonium fluoric acid, with volume composition in the range 65–85% HNO$_3$, 15–25% H$_2$O/acetic acid, and 3–6% NH$_4$F being useful, 73–83% HNO$_3$, 16–23% H$_2$O/acetic acid, and 3–4% NH$_4$F being convenient and about 76% HNO$_3$, 20% H$_2$O, and 4% NH$_4$F being preferred.

The resulting device comprises a substrate having opposed first and second faces, a cavity etched into a portion of the first face and having a bottom and sidewall extending to the first face, wherein the sidewall intersects the first face at an angle of substantially one hundred and twenty-five degrees and intersects the bottom more gradually. Desirably, the diaphragm has a thickness less than ten percent of the substrate thickness.

The invented means and method will be better understood by considering the accompanying drawings and explanation that follows.

BRIEF DESCRIPTION OF THE FIGURES

FIG. 1 is a simplified plan view of a piezo-resistive pressure sensor;

FIG. 2 is a simplified cross-sectional view of the pressure sensor of FIG. 1 at the indicated location;

FIG. 3 is a further simplified cross-sectional view similar to FIG. 2 but showing diaphragm rupture from cavity-side over-pressure;

FIGS. 4–5 are cross-sectional views similar to FIG. 2 but further simplified and at different stages of fabrication;

DETAILED DESCRIPTION OF THE DRAWINGS

Figure 6:
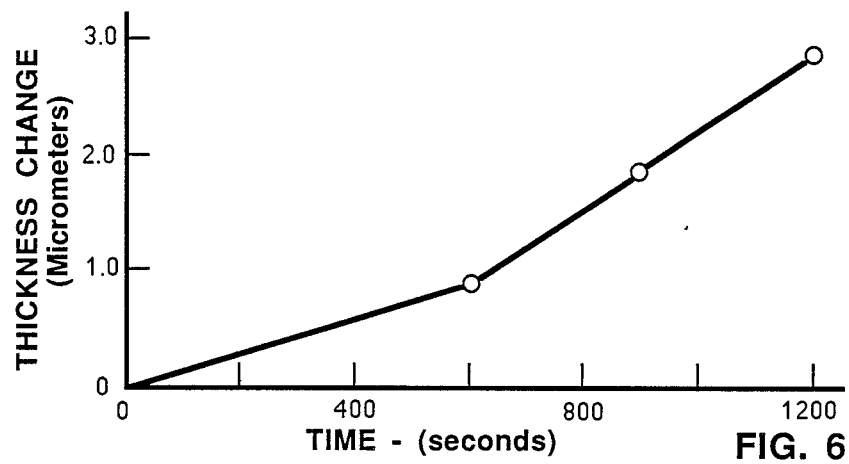
FIG. 6 is a plot of diaphragm thickness change versus isotropic etch time.

FIG. 1 shows a simplified plan view and FIG. 2 shows a simplified cross-sectional view of piezo-resistive pressure sensor 10 comprising substrate 12, cavity 14 diaphragm 16, piezo-resistive element 20, current leads 22 and voltage leads 24. Substrate 12 has thickness 13, cavity 14 has depth 15 and diaphragm 16 has thickness 17. Passivation layer 11 of, e.g. $SiO_2$, covers substrate 12.

In a representative silicon pressure sensing device, substrate thickness 13 is conveniently in the range 0.25–0.51 mm (10–20 mils) with about 0.38 mm (15 mils) being typical. Cavity 14 is anisotropically etched in substrate to provide diaphragm 16 with thickness 17 generally in the range of about 0.013–0.038 mm (0.5–1.5 mils), more typically about 0.020–0.028 (0.8–1.1 mils), and with about 0.025 mm (1.0 mil) being convenient. Thus, depth 15 of cavity 14 accounts for ninety percent or more of thickness 13 of substrate 12. Sensitivity increases but diaphragm breaking strength decreases as diaphragm thickness 17 is decreased and diaphragm area is increased. Typical lateral dimensions are approximately 3.1 by 3.1 mm (120 by 120 mils) die size with diaphragm 16 measuring about 1.4 by 1.4 mm (57 by 57 mils).

FIG. 1 shows pressure sensor 10 as having a square lateral shape with a square diaphragm. This is merely for convenience of illustration. As those of skill in the art will appreciate based on the description herein, sensor 10 and diaphragm 16 may have any convenient lateral shape.

Piezo-resistive or piezo-electric element 20 is typically built into or on front surface 26 of diaphragm 16 but may also be built into or on rear or bottom face 18 of diaphragm 16. Element 20 may be a doped region within diaphragm 16 or a thin film region on the surface of diaphragm 16 or a combination thereof, and be located on either face of or within the diaphragm. Accordingly, reference herein to the pressure sensing element being formed "on" the diaphragm is intended to include all such alternatives or combinations, as well as such others as will occur to those of skill in the art based on the teachings herein. Means and methods for forming piezo-resistive pressure sensing elements in, for example, silicon substrates are well known in the art and are described for example in the U.S. Patents previously noted and incorporated herein by reference.

Cavity sidewall 19 meets rear face 23 of substrate 12 at corner 21 and makes angle 25 therewith. Sidewall 19 meets bottom 18 of diaphragm 16 at corner 27 and makes angle 29 therewith. When cavity 16 is formed by orientation sensitive anisotropic etching, angles 25, 29 of corners 21, 27 have particular values. For example, when substrate 12 is {100} silicon and cavity 14 is formed by anisotropic orientation sensitive anisotropic etching (e.g., using KOH) angles 25, 29 are 125.3 degrees. This is because certain crystallographic planes etch at different rates than other crystallographic planes. The advantage of using such preferential anisotropic etching is that the diaphragm thickness, uniformity and lateral size can be more carefully controlled. This is important to successful manufacture of pressure sensors of high sensitivity and repeatable properties.

An advantage of using semiconductor materials for substrate 12 is (i) that well known semiconductor fabrication techniques may be applied to the manufacture of the pressure sensing element and the diaphragm, (ii) the pressure sensing element may be made monolithic with the diaphragm, and (iii) other passive and/or active components (not shown) may be incorporated in the same semiconductor die containing the pressure sensing element.

FIG. 3 shows a cross-sectional view of pressure sensor 10, similar to FIG. 2, but after catastrophic diaphragm failure from excess pressure applied to the rear face (cavity-side) of the pressure sensor. For simplicity, sensing element 20, leads 22, 24 and passivation layer 11 have been omitted from FIG. 3.

It was found that the maximum pressure that a typical unit could sustain was much smaller when the pressure was applied to rear (cavity-side) face 18, 23 than when applied to front face 26. For example, units which had a front-face diaphragm rupture pressure of 2.07–3.45 MPa (300–500 psi) showed rear-face diaphragm rupture pressures as low as 0.41–0.48 MPa (60–70 psi). This is undesirable.

FIG. 4 illustrates the process by which cavity 14 is conventionally formed in substrate 12. Rear face 23 of substrate 12 is covered by etch mask 30 having opening 32. Front face 26 is usually also be covered by the same etch mask material. Any suitable masking material may be used. Silicon nitride is convenient, but other well known masking materials may also be used.

Anisotropic orientation sensitive preferential etching of substrate 12 is performed though opening 32 to form cavity 14 having bottom 18 and sidewall 19. Because of the characteristics of the anisotropic orientation sensitive preferential etch, corners 21 and 27 are generally very distinct. Methods for orientation sensitive anisotropic etching are well known in the art. Units produced by anisotropic orientation sensitive etching have the asymmetrical diaphragm failure pressures mentioned above, with the rear face (cavity-side) failure pressure being substantially lower than the front face failure pressure.

FIG. 5 is a cross-sectional view similar to FIG. 4 but according to the method and structure of the present invention wherein the anisotropic etching step is followed by a further substantially isotropic etching step which provides new sidewall 19' and new bottom 18' and is believed to modify the contour where the bottom and side intersect at modified corner 27'.

Referring again to FIGS. 3–4, the failure pressure of such etched diaphragms is directly related to diaphragm thickness. If the diaphragm is made thinner, the rupture pressure decreases and if made thicker, the rupture pressure increases. However, thicker diaphragms are also less sensitive than thinner diaphragms, Hence, in the prior art, it has been necessary to trade off sensitivity for increased diaphragm rupture pressure.

Referring now to FIG. 5, it has been found that the rear face (cavity-side) diaphragm rupture pressure can be greatly increased by further thinning of an anisotropically etched diaphragm, provided that the further thinning is done isotropically. Thus, contrary to conventional wisdom, a thinner diaphragm can have a higher rupture pressure than a thicker diaphragm. Unexpectedly, a very substantially improvement is obtained even though only a very small amount of material is removed from the diaphragm. This means that the rear face (cavity-side) rupture pressure can be greatly increased with little or no change in the device sensitivity or decrease in front side rupture pressure. This is highly desirable. Alternatively, greater sensitivity can be obtained for the same rupture pressure by starting with a thinner diaphragm.

square and thickness of about 25.1 micrometers (0.99 mils). A wafer containing a large number of such pressure sensors was cut into eight parts, each part containing substantially identical devices. After anisotropic cavity etching, these parts were subjected to a number of different nominally isotropic etch treatments. The remaining manufacturing steps were then completed in the conventional manner, and the units tested to measure rear face (cavity-side) diaphragm rupture pressure. The initial results are shown in Table I below. The isotropic etchant compositions are provided in Table III.

TABLE I
FINAL DIAPHRAGM THICKNESS, THICKNESS CHANGE AND REAR FACE (CAVITY-SIDE) RUPTURE PRESSURES FOR DIFFERENT ETCH TREATMENTS

| ETCHANT TYPE | ETCH TIME (Sec) | FINAL THICKNESS (micrometers) | THICKNESS CHANGE (micrometers) | AVERAGE RUPTURE STRENGTH (MPa) | MINIMUM RUPTURE STRENGTH (MPa) |
|---|---|---|---|---|---|
| A | 1200 | 17.8 | 7.4 | 0.87 | 0.83 |
| B | 10 | 19.3 | 5.8 | >1.45 | >1.45 |
| B | 20 | 15.5 | 9.7 | >1.45 | >1.38 |
| B | 35 | 10.7 | 14.5 | >1.45 | >1.45 |
| C | 1200 | 22.4 | 2.8 | >1.45 | >1.45 |
| C | 900 | 23.4 | 1.8 | >1.45 | >1.45 |
| CONTROL | 0 | 25.1 |  | 0.81 | 0.69 | gram. Those of skill in the art will appreciate based on the teachings therein, that various intermediate combinations of improved sensitivity and rupture pressure can also be obtained.

EXAMPLE

Silicon pressure sensors having a structure similar to those illustrated in FIGS. 1-2 were prepared on {100} N-type substrates such as those described above using means well known in the art. A P-type piezo-resistive sensing element was formed by ion implantation and/or other doping into the N-type substrate and aluminum contacts applied thereto. It is desirable to perform the doping steps before cavity etching and to apply the metal contacts after cavity etching, but that is not essential.

Cavity etching to obtain the thin diaphragm was performed using conventional orientation sensitive anisotropic etching. A doped etch stop layer is not used in the diaphragm for thickness control. Rather, diaphragm thickness is set by controlling the etching time under standardized etching conditions for a predetermined starting wafer thickness. Such cavity etching procedures are well known in the art and KOH is a well known suitable etchant.

The finished pressure sensing device was bonded cavity-side down, by for example soldering, to a metal housing or to a metal leadframe suitable for encapsulation in a plastic housing. The devices were then subjected to rear face (cavity-side) tests to determine the rear face diaphragm rupture pressure.

The starting N-type wafer substrate thickness was about 0.38 mm (15 mils). After anisotropic etching and before isotropic etching, the diaphragms of the test devices had lateral dimensions of about 1.4 mm (57 mils)

Etchant A removed about 29% of the diaphragm thickness but increased the average rupture pressure by only about 7% and the minimum rupture pressure by about 10%.

Etchant B removed for the different etch times, 23%, 39% and 58% of the diaphragm thickness, respectively, and increased the average rupture pressure by at least 78% and the minimum rupture pressure by about 100-110%. However, these large changes in diaphragm thickness also affected other sensor properties so that the device characteristics were substantially different than the characteristics of those devices not receiving such isotropic etch treatment.

Type C etchant removed 7-11% of the diaphragm thickness while raising the average rupture pressure by at least 78% and the minimum rupture pressure by at least 110% for both etch times. Because the amount of diaphragm material removed using the type C etchant is of the order of about 10% or less of the diaphragm thickness, other sensor properties are much less affected than for the other etching examples.

">" symbols in Table I denote that, in many samples, the bond between substrate 12 and its mount (not shown) failed before diaphragm rupture, indicating that the actual diaphragm rupture pressure of these samples was higher than recorded. Under these circumstances the true average rupture pressure will also be higher than the numbers indicated in the table.

In a further experiment, two wafers were quartered and put in type C etchant for time periods of 180, 300 and 600 seconds. The average and minimum rupture pressure for these etch times are shown in Table II along with data for the associated control samples ("0 SEC" etch time).

TABLE II

REAR FACE (CAVITY-SIDE) RUPTURE PRESSURES FOR DIFFERENT ETCH TIMES FOR ETCHANT "C"

| WAFER NO. | ETCH TIME | | | | | | | |
|---|---|---|---|---|---|---|---|---|
| | 0 SEC RUPTURE STRENGTH (MPa) | | 180 SEC RUPTURE STRENGTH (MPa) | | 300 SEC RUPTURE STRENGTH (MPa) | | 600 SEC RUPTURE STRENGTH (MPa) | |
| | AVG. | MIN. | AVG. | MIN. | AVG. | MIN. | AVG. | MIN. |
| 19 | 0.82 | 0.62 | 1.19 | 0.83 | 1.43+ | 1.00 | 1.55+ | 1.31 |
| 23 | 0.80 | 0.69 | 1.25 | 0.93 | 1.47+ | 1.17 | 1.59+ | 1.31 |

The decrease in diaphragm thickness associated with the etch times in Table II for etchant C is very small. After 600 seconds in the type C etch the change in diaphragm thickness was found to be only about 0.7–1.0 micrometers (0.03–0.04 mils), i.e., about 3–4% of the diaphragm thickness. The average rupture pressure for this etch time increased by at least 89–99% and the minimum rupture pressure increased 90–111%.

The change in diaphragm thickness for etch times of 180 and 300 seconds are expected to vary proportionately (see FIG. 6) but were below the direct measurement threshold of the available instruments. For 300 seconds etch time, the average rupture pressure increased by at least 74–84% and the minimum rupture pressure increased 61–70%. For 180 seconds etch time, the average rupture pressure increased by 45–56% and the minimum rupture pressure increased by 34–35%. Because the diaphragm thickness changes in these tests were less than about 5%, e.g., 1–2%, of the diaphragm thickness there is a correspondingly smaller impact on other sensor properties.

The "+" signs in Table II accompanying some entries indicate that some diaphragms had rupture strengths greater than the 1.65 MPa (240 psi) pressure limit for these tests and therefore did not fail. In this circumstance, the actual average rupture pressure is higher than the numerical value in the table.

Still further experiments were performed with a greater maximum pressure test limit and improved sensor mounting seals on samples that had been etched for 600 seconds in type C etchant. These experiments gave cavity-side rupture pressures consistently above about 2.42 MPa (350 psi). This is a 300% improvement over anisotropic etched cavity pressure sensors that had not received the invented isotropic etch treatment but which were otherwise substantially similar.

It is preferable that the amount of diaphragm material removed during the isotropic etching step be about ten percent or less of the diaphragm thickness, preferably about five percent or less. Substantial improvement in rupture strength is obtained even under conditions where the estimated change in diaphragm thickness is as small as 1–3%.

It is also desirable to use relatively slow etchants, provided that they produce the desired effect of increasing the cavity-side rupture pressure. The type A etchant gave a fairly slow etching rate (about 6 nanometers/second) but comparatively small improvement (7–10%) in cavity-side rupture strength. The type C etchant gave etching rates of about the same order (1.4–3.3 nanometer/second) but very much larger improvement (100–300%) in cavity-side rupture pressure. In general it is desirable to use etchants that thin the diaphragm at about ten nanometers/second or less, conveniently about five nanometers/second or less, and preferably about 1–4 nanometers/second. The preferred type C etchant removed about 1.4–2.3 nanometers/second of diaphragm thickness on the average and about 3.1–3.3 nanometers/second incrementally. The shorter the etch time, the lower the apparent diaphragm etching rate that was observed.

Figure 7:
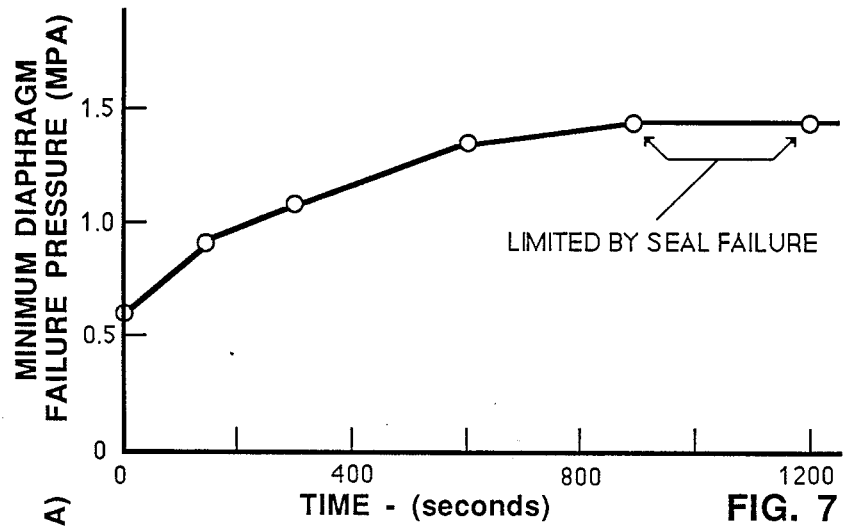
FIG. 7 is a plot of minimum rear face (cavity-side) diaphragm rupture pressure versus isotropic etch time.
Figure 8:
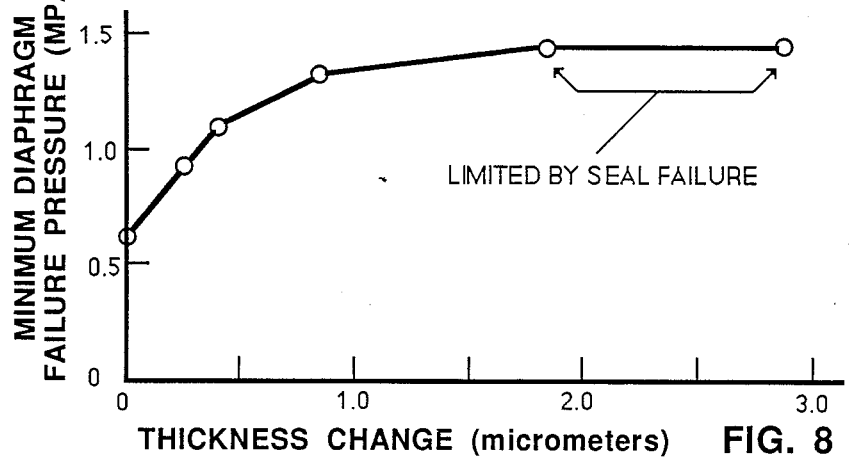
FIG. 8 is a plot of minimum rear face diaphragm rupture pressure versus diaphragm thickness change during isotropic etching.

FIG. 6 shows a plot of measured diaphragm thickness changes versus etch time for type C etchant from which the changes in diaphragm thickness for smaller times may be estimated by linear extrapolation. FIG. 7 is a plot of minimum rear face (cavity-side) diaphragm rupture pressure versus etch time and FIG. 8 is a plot of minimum rear face diaphragm rupture pressure versus diaphragm thickness change for type C etchant.

Table III shows the type and composition of the various etchants.

TABLE III

COMPOSITION OF TEST ETCHANTS (Volume Percent)

| ETCHANT | COMPOSITION |
|---|---|
| A | Dry low pressure plasma; 91.5% $CF_4$, 8.5% $O_2$. |
| B | Wet dip etch: 56% $HNO_3$, 22% HF, 22% $CH_3COOH$. |
| C | Wet dip etch; 76.3% $HNO_3$, 3.7% $NH_4F$, 20.0% $H_2O$. |

The wafer temperature during plasma etching is not precisely known but is believed to be less than 100° C. The wet etchants were at a temperature of about 25° C.

FIG. 5, which is a cross section similar to FIG. 4, shows what is believed to be the effect of subjecting anisotropically etched cavity 14 to a further isotropic etching step. An isotropic etching step is believed to etch substantially equally in all directions so that new bottom 18' and new sidewall 19' are formed. It is believed that during this isotropic etching step there is a tendency for sharp corners to be rounded. Thus, the radius of curvature of modified corner 27' is expected to increase so that sidewall 19' and bottom 18' now intersect more gradually, i.e., the microangle 29' at new corner 27' where bottom 18' and sidewall 19' meet is larger than angle 29 at original corner 27 before the isotropic etching step. It is expected that angle 25' where sidewall 19' meets rear face 23 will be less affected.

While etchant composition "C" is preferred for the isotropic etching step, it is expected that etchant compositions in the range of about 65–85% $HNO_3$, 15–25% $H_2O$, and 3–6% $NH_4F$, by volume, are also useful with the narrower range of about 73–83% $HNO_3$, 16–23% $H_2O$, and 3–4% $NH_4F$ being convenient. Also, acetic acid ($CH_3COOH$) or acetic acid-water mixtures may be used in place of pure water for the diluent in the above etchant compositions. Those of skill in the art will understand, based on the information given here, how to adjust the etchant composition for different circumstances.

It is readily apparent from the above-presented etching data and FIG. 7 that a significant improvement in rear face (cavity-side) diaphragm rupture pressure is obtained, even though there is little change in the contour of cavity 14 because the actual amount of diaphragm material removed during this etch is extremely small. This is an unexpected result. As a consequence of this discovery, it is possible to provide devices of substantially improved rear face rupture pressure without significant effect on the other diaphragm thickness sensitive device parameters (e.g., sensitivity, calibration, front-face rupture pressure, etc.). This is an important improvement.

Having thus described the invention, it will be apparent to those of skill in the art that the invented method and structure provides improved rear face (cavity-side) diaphragm rupture pressure without significant adverse affect on other device parameters. Further, the attainable improvement in minimum and/or average rupture pressure is so large (e.g., 100-300%), that a beneficial trade-off can be made between rupture pressure and sensitivity. For example, devices of greater sensitivity but adequate rupture pressure are obtained by starting with initially thinner anisotropically etched diaphragms and then subjecting them to the above-described isotropic etching treatment. The thinner diaphragm has a higher sensitivity and the invented isotropic etch step provides greater rupture pressure than could otherwise be obtained with the thinner diaphragm.

While the present invention has been described for silicon based piezo-resistive pressure sensors, those of skill in the art will appreciate that the present invention applies to other devices and to other materials which exhibit crystallographic orientation etch sensitivity and devices produced using such properties, or using other materials and/or other forms of anisotropic etching. Further, the invented process is applicable to other pressure sensing elements besides piezo-resistive elements, as for example but not limited to, piezo-electric elements.

Accordingly, it is intended to include within the scope of the claims that follow all such variations and equivalents as will occur to those of skill in the art based on the teachings herein.

We claim:

1. A process for forming etched cavity devices comprising:
    providing a substrate having first and second opposed faces;
    anisotropically etching a cavity in the substrate from the first face to form a diaphragm adjacent the second face;
    isotropically etching the cavity to increase the diaphragm rupture pressure for pressure applied to the first face.

2. The process of claim 1 further comprising, after the first providing step, forming a pressure sensing element on the diaphragm.

3. The process of claim 1 further comprising, after the first providing step, forming a pressure sensing element on the second face.

4. The process of claim 1 wherein the isotropic etching step comprises removing less than ten percent of the thickness of the diaphragm.

5. The process of claim 4 wherein the isotropic etching step comprises removing less than five percent of the thickness of the diaphragm.

6. The process of claim 1 wherein the isotropic etchant comprises 65-85% nitric acid, 15-25% water or acetic acid or acetic acid-water mixtures, and 3-6% ammonium fluoric acid, by volume.

7. A process for forming etched cavity devices, comprising:
    providing a piezo-resistive substrate material having front and back opposed faces;
    anisotropically etching part of the rear face to form a cavity extending into the rear face and having a bottom and a sidewall extending between the bottom and the rear face of the substrate, wherein the sidewall and bottom intersect at a corner;
    further etching to round the corner.

8. The process of claim 7 wherein the anisotropically etching step comprises forming a corner having an angle of approximately one hundred and twenty-five degrees.

9. The process of claim 7 wherein the substrate is silicon and the further etching step comprises etching with a mixture of nitric acid, water or acetic acid or a mixture thereof, and ammonium fluoric acid.

10. The process of claim 9 wherein the isotropic etchant comprises 65-85% nitric acid, 15-25% water or acetic acid or water-acetic acid mixture, and 3-6% ammonium fluoric acid, by volume.

11. The process of claim 10 wherein the mixture comprises 73-83% nitric acid, 16-23% water or acetic acid or water-acetic acid mixture, and 3-4% ammonium fluoric acid, by volume.

12. A process for forming a semiconductor devices having a thin etched diaphragm, comprising:
    providing a single crystal semiconductor substrate having first and second opposed major surfaces, the first of which exhibits orientation sensitive anisotropic etching;
    masking the first surface with an etch resistant mask having an opening therein extending to the first surface;
    removing by orientation sensitive anisotropic etching a portion of the substrate exposed under the opening to form a diaphragm therein having a first face oriented toward the first surface and a sidewall extending therefrom to the first surface;
    thereafter isotropically etching at least the intersection of the first face and the sidewall.

13. The process of claim 12 wherein the isotropically etching step comprises removing less than ten percent of the diaphragm thickness.

14. The process of claim 13 wherein the isotropically etching step comprises removing less than five percent of the diaphragm thickness.

15. The process of claim 12 wherein substrate comprises silicon and the isotropically etching step comprises etching at a rate less than about ten nanometers of diaphragm thickness per second.

16. The process of claim 12 wherein substrate comprises silicon and the isotropically etching step comprises etching at a rate less than about five nanometers of diaphragm thickness per second.

17. An electronic device comprising:
    a semiconductor substrate having opposed first and second faces;
    a cavity etched into a portion of the first face and having a bottom and sidewall extending to the first face, and wherein the sidewall intersects the first face at an angle of substantially one hundred and twenty-five degrees and intersects the bottom more gradually.

18. The device of claim 17 wherein the substrate comprises silicon of a first predetermined thickness and the cavity bottom forms a first wall of a diaphragm whose opposed second wall comprises part of the second face of the substrate and wherein the diaphragm has a second thickness less than ten percent of the first thickness.

19. The device of claim 18 formed by the process of first anisotropically etching the cavity to produce a diaphragm of the second thickness and thereafter further etching the cavity to round the intersection between the sidewall and the bottom with less than ten percent reduction in the second thickness.

20. The device of claim 17 formed by the process of first anisotropically etching the cavity to produce a diaphragm of a first cavity-side diaphragm rupture pressure and thereafter isotropically etching the diaphragm to provide a thinner diaphragm of a second cavity-side diaphragm rupture pressure larger than the first rupture pressure.

* * * * *